United States Patent [19]

LaGuardia

[11] Patent Number: 4,532,828
[45] Date of Patent: Aug. 6, 1985

[54] KINEMATIC MECHANISM

[76] Inventor: Francesco LaGuardia, Lavorate Centro 4, Sarno, Italy, 84080

[21] Appl. No.: 271,628

[22] Filed: Jun. 8, 1981

Related U.S. Application Data

[63] Continuation-in-part of Ser. No. 966,791, Dec. 6, 1978, abandoned, which is a continuation of Ser. No. 503,132, Sep. 16, 1974, abandoned.

[30] Foreign Application Priority Data

Jan. 23, 1974 [IT] Italy .................. 64802 A/74

[51] Int. Cl.³ .............................................. F16H 57/10
[52] U.S. Cl. ........................................ 74/793; 74/674; 74/681; 74/757; 74/777
[58] Field of Search ................. 74/793, 777, 757, 674, 74/681, 781 R, 695, 710, 682, 766, 767, 417

[56] References Cited

U.S. PATENT DOCUMENTS

| 759,157 | 5/1904 | Coffee | 74/757 |
|---|---|---|---|
| 1,049,577 | 1/1913 | Halma | 74/767 |
| 1,208,644 | 12/1916 | Pollard | 74/767 |
| 1,416,074 | 5/1922 | Storle | 74/757 |
| 1,457,945 | 6/1923 | Smith | 74/757 |
| 2,881,639 | 4/1959 | Holtan | 74/681 |
| 3,119,281 | 1/1964 | Gerber et al. | 74/681 |
| 3,138,039 | 6/1964 | Zeidler et al. | 74/574 |
| 3,403,584 | 10/1968 | Ellis et al. | 74/777 |
| 3,511,112 | 5/1970 | Power et al. | 74/757 |
| 4,055,091 | 10/1977 | Kerr | 74/681 X |

FOREIGN PATENT DOCUMENTS

| 489902 | 1/1930 | Fed. Rep. of Germany | 74/757 |
|---|---|---|---|
| 495873 | 10/1919 | France | 74/793 |
| 441927 | 11/1948 | Italy | 74/674 |

Primary Examiner—Allan D. Herrmann
Assistant Examiner—Joseph M. Rolnicki
Attorney, Agent, or Firm—Wells, St. John & Roberts

[57] ABSTRACT

A system permitting a wide range of distribution, transmission, and reduction of rotary motion by means of a double epicyclic train. Two crown wheel plates face one another and are freely rotatable, one on a driving shaft and the other on coaxial driven shaft. The shafts also rigidly mount two facing inner planetary conical pinions that are coaxial and concentric with the respective crown wheel plates. Sandwiched between the plates are two sets of satellite pinions; the first set meshing with the crown wheel plates and the second set meshing with the planetary conical pinions. Both sets of satellite pinions freely rotate on cruciform axles. The cruciform axles, in turn, rotate freely about the coaxial driving and driven shafts. The system may be adapted to provide an automatic speed change gear system or, alternatively, a friction clutch system. In the friction clutch arrangement, one of the crown plates is held immobile so rotation is transmitted to the other crown plate indirectly by the cruciform axles and satellite gears. If braking forces are applied selectively to the rotating plate, rotational movement of the driving shaft will be passed smoothly through the satellite gears to the driven shaft. In the automatic speed change gear system, one crown wheel plate and a corresponding planetary conical pinion are interconnected by a rotary conditioning system so the remaining plate and pinion can be controlled to produce varied rotational velocity of the driven shaft.

7 Claims, 7 Drawing Figures

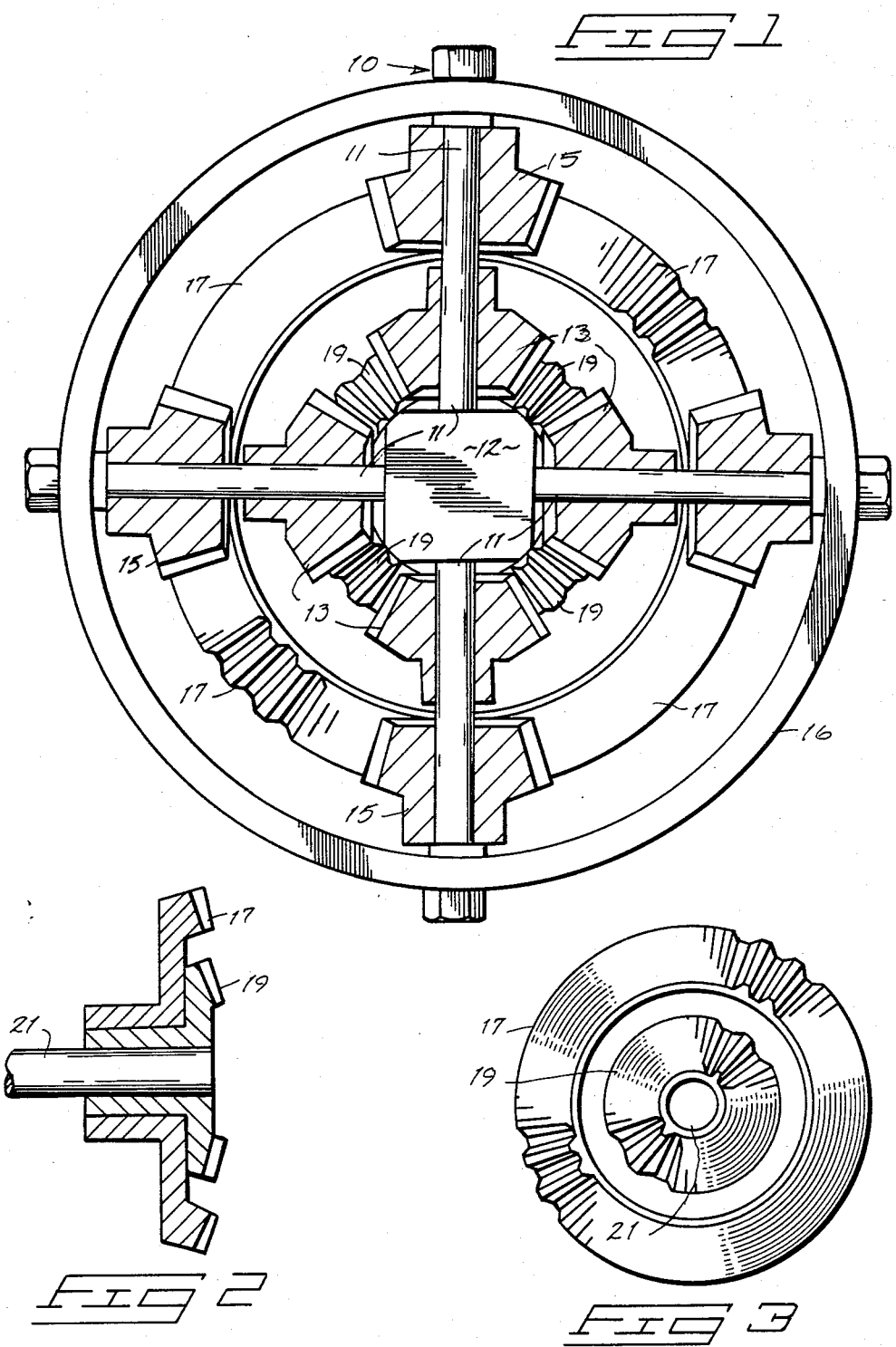

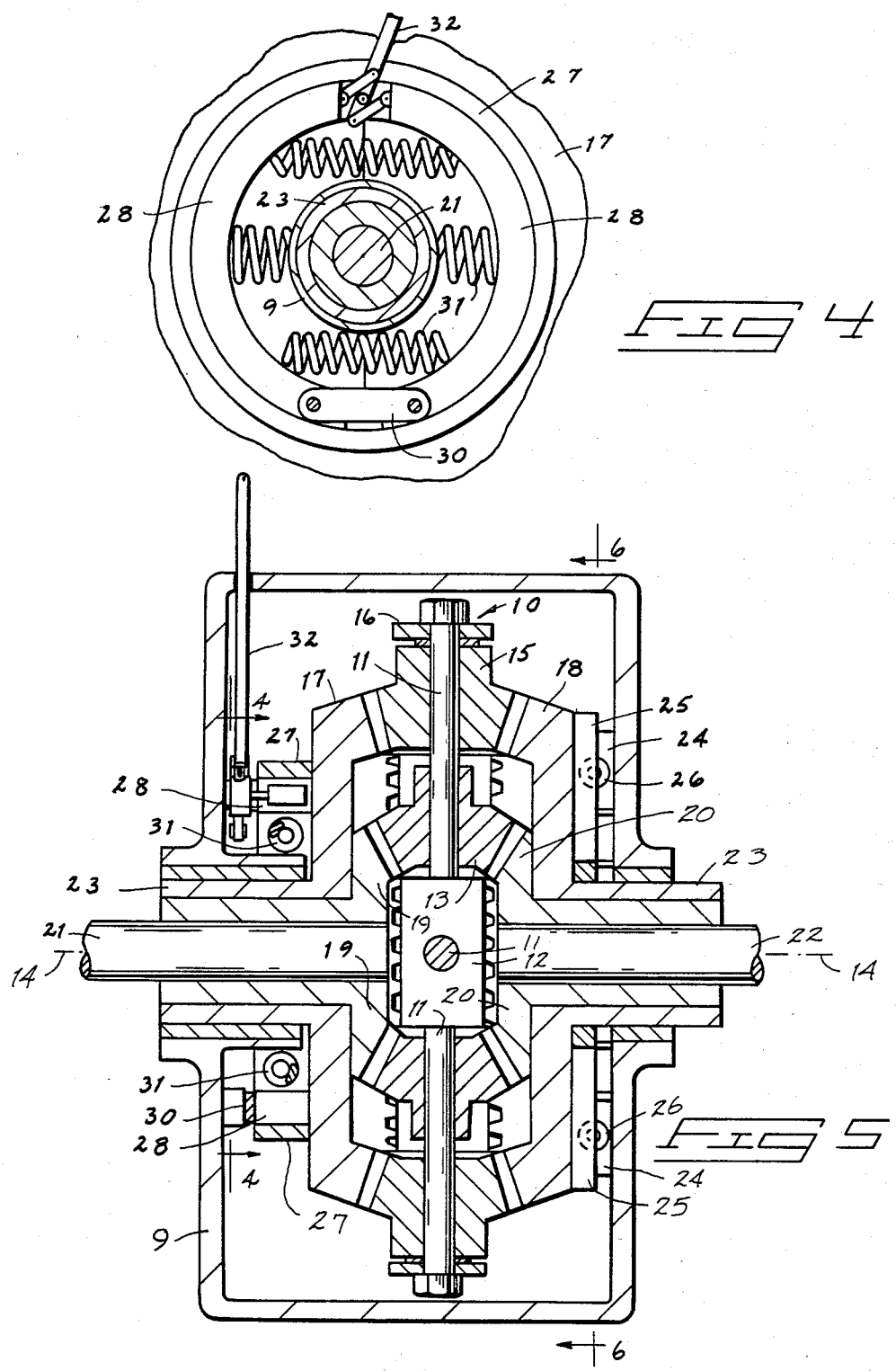

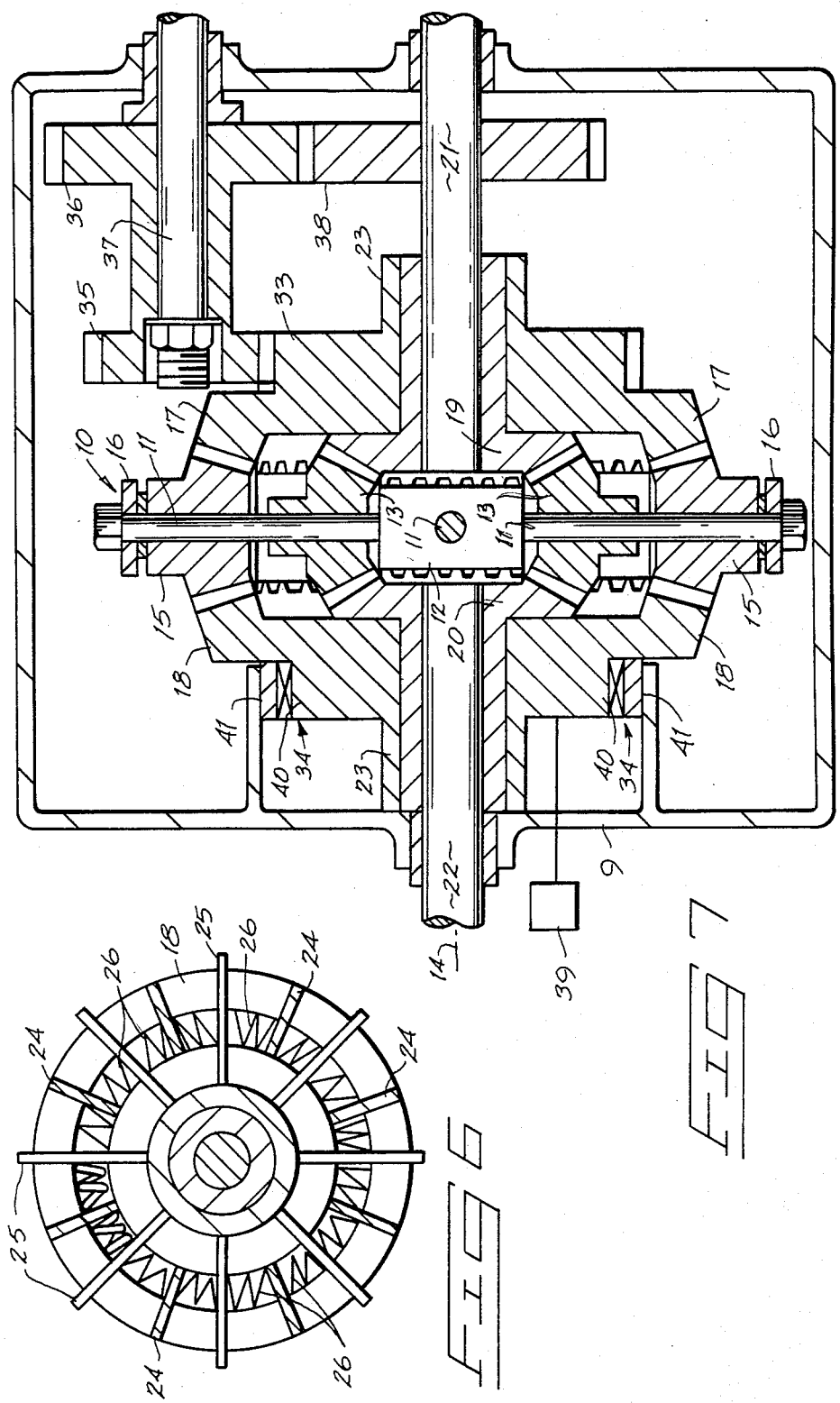

KINEMATIC MECHANISM

This application is a continuation-in-part of U.S. patent application, Ser. No. 966,791, filed Dec. 6, 1978 (now abandoned) filed as a continuation of U. S. patent application Ser. No. 503,132 filed Sept. 16, 1974 (also abandoned).

BACKGROUND OF THE INVENTION

This invention relates to the mechanical field of automatic and progressive speed change gears.

Speed changing gears or transmissions are kinematic mechanisms intended to utilize the power available from a rotating driving shaft by varying two component factors of driving power: force-moment, and angular velocity.

It is presently not possible to entirely exploit motor or engine power because it is not possible to completely utilize the full rotational velocity of the engine drive shaft, whether the associated speed changing gears are continuous or discontinuous.

In fact, with discontinuous speed changing gears, the connection to the vehicle drive wheels requires that the engine speed vary continuously. This is so, because the wheels themselves transmit a resistant couple, whose moment depends on the conditions of the roadway. For example, resistance builds as the vehicle moves up an incline and reduces as the vehicle moves downhill.

The problem is not completely solved by modern continuous speed gears, most of which are supplied with one form or another of a fluid drive gear shift. They are designed in order to equilibrate the eventual difference between the moment of the motor-couple and that of the resistant-couple through centrifugal force of the fluid drive.

In reality, the internal slipping action of such fluid drives involves an enormous waste of motor energy and a greater consumption of fuel. Moreover these types of gear shift drives are heavy, cumbersome, complicated, expensive and cannot be applied indescriminantly to all vehicles.

The problem is solved with the present invention. When used as an automatic speed gear, the present device can be used without a fluid drive gear shift by causing simultaneous rotation and revolution to transmit driving forces progressively from a minimum to maximum velocity and vice versa in a continuous steady progression.

The present invention differs from those in current use in that it utilizes, in a different way, the relation passing between motor-power, traction-force and velocity, allowing a more efficient transformation of thermic and kinetic energy into mechanical output.

If it is possible to obtain a motor-moment corresponding to a resistant-moment of equal value, i.e. a motor-power corresponding in continuous dynamic equilibrium to a resistant-work, it is also possible to considerably reduce the dispersion of thermic energy and to transform it more efficiently into mechanical output. Thus, with the present invention, it will be possible to construct lighter and simpler engines, since the kinetic energy of the gasses act more potently, permitting the engine to run at a constant rate while velocity of the associated vehicle or driven member is liable to vary infinately through a selected range.

The present mechanism may be widely applied to vehicles with internal combustion engines, to machine tools, to electrical generators (exploiting the mass more than the speed of stream, sea currents, winds, etc.) and to many other applications for transmission of mechanical power through rotary motion.

The present mechanism has the virtue of varying the velocity between the driving and driven shaft, without requiring use of preselected gear ratios, fluid drive, gear shifts, centrifugal clutches, and other members in use at the present time.

It also has the property of maintaining constant maximum traction-force of an associated engine, under the same motor power, while permitting the velocity of the vehicle to vary continuously through a wide range.

A primary object of this invention is to provide a kinematic mechanism that can be adapted as a progressive change speed gear which, by eliminating the usual transmission gearing and added members, permits, under the same power, to keep the maximum traction-force of an engine constant while varying the velocity of an associated vehicle or other driven mechanism.

When the present mechanism is used in the automotive industry, engines may be more powerful and more silent. They may consume less fuel, contaminate the atmosphere much less, and have longer life. Additionally, the vibrations, stresses, and abrupt motions throughout the mechanical elements may be considerably reduced and, as a result, the associated vehicle will be more stable on the road.

Another object of the present invention is to provide a kinematic mechanism that will permit a great reduction in angular velocity between a driving and a driven shaft, through a double conical epicyclic train.

Another important object is to provide such a kinematic mechanism that may be adapted as a friction clutch capable of infinitely varying the speed of an output or driven shaft between 0 velocity and a selected maximum velocity from a constant velocity driving shaft.

BRIEF DESCRIPTION OF THE DRAWINGS

FIG. 1 is a sectional view showing a cruciform reducer and other basic components of the present kinematic device;

FIG. 2 is a reduced sectional view through a single crown wheel plate and central planetary pinion showing their interrelationships;

FIG. 3 is a diagrammatic end view as seen from the right in FIG. 2;

FIG. 4 is a sectional view of a friction clutch system taken substantially along line 4—4 in FIG. 5;

FIG. 5 is a longitudinal section view taken through the present kinematic device adapted as a friction clutch system;

FIG. 6 is a sectional view taken along line 6—6 in FIG. 5 showing the manner in which one of the crown wheel plates is attached to an associated framework;

FIG. 7 is a longitudinal sectional view taken through the present kinematic device especially adapted as an automatic speed gear system.

DETAILED DESCRIPTION

The present invention is based on a kinematic mechanism of cruciform reduction or gear reduction through a conical, double epicyclic gear train using a cruciform reducer 10 as shown in FIG. 1. This is the basic unit of the present invention for allowing continuous selective control of rotational forces passing from a driving shaft 21 to a driven shaft 22. Adaptations of the present basic arrangement are shown in the remaining figures of the drawings, wherein a friction clutch system and an automatic change speed gear arrangement are shown.

The basic components of the present invention are mounted within a housing or general framework 9. The present cruciform reducer includes a cross brace 12 supporting radially extending cruciform axles 11. Four central conical satellite pinions 13 are mounted each to an axle and close to a central longitudinal axis 14 about which the axles rotate. The four central conical satellites 13 will rotate freely about the intersecting axes of the axles 11 while the axles may themselves rotate about the axis 14.

Four outer coaxial satellite pinions 15 are also mounted for free rotation to the individual cruciform axles 11. The satellites 15 rotate freely and independently of the satellites 13 but on the same axles 11.

A holding ring 16 is mounted at the extreme outward ends of the axles 11. All satellites 13, 15 are encircled by the ring 16 and held in radial position along their respective mounting axles. The ring 16 will rotate with the satellites and axles about the central axis 14 in a plane perpendicular to the axis 14. The axes of axles 11 are also perpendicular to the central axis 14.

All of the satellites 13, 15 and cruciform axles 11 make up the cruciform reducer 10 (FIG. 1) that is housed between two crown gear plates 17, 18 and two respective planetary conical pinions 19, 20 all centered on the axis 14. The satellites 13, 15 and cruciform axles 11 interact with the crown gear plates and planetary conical pinions in such a way that they may both rotate and revolve simultaneously. The satellites will rotate about the axes of the cruciform axles, and the axles may, themselves, rotate about the central longitudinal axis 14. The satellites may then be said to revolve about the axis 14.

The outer satellites 15 are so arranged that they rotate in revolution between the facing crown wheel plates 17 and 18. The inner central satellites 13 are so arranged as to rotate in revolution between the two planetary conical pinions 19, 20. One of the pinions 19, 20 is shown at the center of FIG. 3.

The planetary pinions 19 and 20 are spaced along the axis 14 a short distance from each other. They are concentric with the respective crown wheel plates 17, 18. Pinions 19 and 20 are fixed to ends of coaxial shafts 21 and 22 as shown in all views except FIG. 1. Of the two shafts 21, 22 one is considered a driving shaft 21, the other a driven shaft 22. The respective planetary pinions 19, 20 and shafts 21, 22 are disposed coaxially with respect to each other along axis 14.

The shafts 21, 22 pass through hubs 23 of the plates 17 and 18. In fact, the plates 17 and 18 are mounted to the pinions and therefore to the shafts for free relative rotation about the axis 14.

The pinions 19 and 20 rotate only with the shafts 21 and 22. The crown gear plates 17 and 18, on the other hand, rotate freely independently of the pinions 19, 20 and affixed shafts 21, 22.

Before proceeding to illustrate the application of the present kinematic mechanism to a friction clutch and to a progressive change speed gear, it will be useful to examine the basic characteristics of the present mechanism.

In the first place, it is important to observe that the revolution movement of the coaxial satellites 13, 15 may be stopped: either when both crown wheel plates 17 and 18 are stationary, or when they turn simultaneously in opposite directions with the same number of rotations. That is, when the crown wheel plates 17 and 18 are stationary, or when they turn in opposite directions, the axles of the cruciform reducer may be immobile about the axis 14.

Moreover, both plates 17 and 18 can turn in the same direction as the cruciform reducer. One of the plates 17 or 18 can be completely stopped or it can turn in the same or the opposite direction of the other plate, but with an inferior or superior rotation rate. Both pinions 19, 20 can do the same, considering the rotation of the driving pinion and the driven pinion thereof.

The plates 17, 18 have a normal tendency to reach the same rotational speed when unrestricted. If they turn in opposite directions, the revolutions of the cruciform reducer will tend to decrease. If the plates turn in the same direction, the revolutions of the cruciform reducer will tend to increase.

The plates, whether they turn in opposite or the same directions can progressively speed up by means of the cruciform reducer, until either they effect the same rate or overtake each other reciprocally.

It is important to observe furthermore that, if a plate 17 or 18 and its respective planetary pinion 19 or 20, are both kept immobile, the opposite plate and pinion will perform at the same rotation rate, independently of the gear tooth ratio existing between satellites, planetary pinions and plates. This ratio does not modify operation of the present mechanism. That is to say, if the central satellites 13 have more gear teeth than the outer satellites 15 (or vice versa) the operation of the mechanism will remain the same. For example, if both plates 17, 18 have fifty teeth, or one hundred teeth, the operation of the mechanism will remain the same.

The gear ratio does however reduce to a varying degree the input driving power when both plates or one plate only are dragged into motion indirectly through the cruciform reducer 10.

From the foregoing, some of the above mentioned characteristics of the invention being understood, it is possible to adapt the present mechanism to obtain both friction clutch and automatic change speed gears, without requiring a fluid drive or manual gearshift.

Friction Clutch

An important feature of the present invention becomes evident when one plate 17 or 18 is kept completely immobile and the other plate is dragged into motion indirectly by the cruciform reducer 10 and thereby undergoes a reduction in power. Because of this feature, it is easy to obtain a friction clutch system.

By way of example, the "driven" crown wheel 18 may be considered stopped, but oscillating for this purpose by means of the motion limiting attenuating mechanism illustrated in FIG. 5 and especially in FIG. 6. This mechanism includes a spider with supporting bars 24 affixed to the general housing or framework 9. The supporting bars 24 extend radially toward the axis 14 along the frame but do not touch the plate 18. Panels or pawls 25 are affixed to a back surface of the plate 18 and extend radially toward the axis 14. They are situated angularly between the bars 24.

The supporting bars 24 are fixed relative to the frame 9. The panels or pawls 25 are fixed to the plate 18 between the bars 24. Oscillating motion of the plate is attenuated relative to the general frame by placement of compression springs 26 between adjacent bars 24 and panels or pawls 25. The springs 26 permit oscillation of the plate in order to attenuate the jerks and shocks on the teeth of the several gears, while holding the plate 18 substantially immobile.

The driving crown 17 as shown in FIGS. 4 and 5 is supplied with an integral brake shoe drum 27. The driving crown plate 17 may be considered movable along with its coaxial brake shoe drum 27 about the central longitudinal axis 14. Such rotation, it should be remembered, is independent of the central driving conical pinion 19. The driving crown 17 is carried for free rotation on the hub of the driving conical pinion 19.

FIGS. 4 and 5 illustrate two brake shoes 28 mounted to the frame 9 and disposed within the cylindrical brake shoe drum 27. The brake shoes 28 are mounted to the frame 9 through a brake shoe hinge 30 and may be expanded and contracted against brake shoe springs 31 by a lever mechanism 32. It is pointed out that the brake shoes 28 are mounted to the general frame 9 and therefore do not rotate. Therefore, when the lever 32 is actuated, the shoes may contract away from the drum 27 or expand to engage the drum, causing the driving crown plate 17 to stop rotating. It is pointed out that the action of the brake shoes functions only on the drum 27 and integral driving crown plate 17. It has no direct affect on the concentric central pinion 19.

At this point it is simple to slow down the drum 27 along with the plate 17, while the opposite, driven crown plate 18 is allowed to oscillate without rotating.

In fact, by operating the lever 32, the brake shoes 28 may gradually stop the drum 27 and crown plate 17 so rotational movement will pass smoothly from the driving pinion 19 to the driven pinion 20 through satellites 13. Since both plates 17 and 18 are stationary, the outer satellites 15 cannot rotate. Hence the cruciform axles are held relatively stationary about the axis 14. The free wheeling inner satellite pinions 13, however, are meshing with movable gears 19 and 20. They will therefore transmit rotation directly from the driving pinion 19 to the driven pinion 20. Direct rotation is thereby transmitted between the driving shaft 21 and the driven shaft 22. The driving shaft 21 and the driven shaft 22 rotate in opposite directions.

When the brake shoes are compressed, leaving frictional engagement with the drum 27, the driving plate 17 is gradually dragged into motion indirectly by the cruciform reducer 10. The drum 27 and associated driving crown plate 17 will gain in rotations, while the planetary pinion wheel 20 connected with the driven shaft 22 loses rotations. In this case, rotation does not pass directly from the driving shaft 21 to the driven shaft 22. Instead, it passes from the driving shaft 21 to the driving plate 17 by means of the double epicyclic train of the cruciform reducer. Thus, the rotations lost at the driven shaft 22, are taken up by rotations of the driving crown plate 17 and shaft 22 will not rotate under load.

Automatic Speed Gear

The present kinematic mechanism can be adapted as an automatic speed gear system by modifying the basic kinematic mechanism as shown in FIG. 7 and as described below.

It should be noted that the plates and shafts are shown reversed in FIG. 7 with driving shaft 21 on the right in FIG. 7. Actually it makes no difference which side the drive is on with regard to the basic mechanism as it is symmetrical.

With the arrangement shown in FIG. 7, the plates 17, 18 may turn in the same or in opposite directions. They may perform at equal, inferior or superior rotation rates as compared with each other, in harmony with the shafts 21, 22 carrying the planetary driving and driven pinions 19, 20. That is to say the plates 17, 18 and the corresponding shafts 21, 22 may perform simultaneously at different acceleration as well as different velocity.

The sectional view of FIG. 7 illustrates principal parts of the mechanism shown in FIG. 5 but the plates 17, 18 in this adaptation are both independently rotatable and mount a rotary conditioning system as described below.

The rotary conditioning system is comprised of a series of gears including two cog wheels 35 and 36 having a very small difference in ratio. The wheels 35 and 36 are fixed relative to one another, forming one piece. They rotate freely on the same axle shaft 37. The axis of shaft 37 is parallel to axis 14. The shaft 37 is fixed to the frame or housing 9.

The cog wheel 35 meshes with a cog wheel 33 that may be fixed or integral with the crown plate 17. Another cog wheel 38 is fixed to the driving shaft 21 and meshes with the cog wheel 36.

It should be noted that such a conditioning system applies to the crown plate 17 that is mounted concentric with the driving shaft 21.

A one way brake 34 of known form is mounted to the crown plate 18 that is concentric with the driven shaft 22. The nave 40 of the one way brake is made integrally with the driven crown plate 18 and rotates with the plate 18 in the same direction as the driven shaft 22. An outer ring 41 of the one way brake 34 is mounted and fixed to the frame 9. It is immobile. Clutch 34 permits reverse loading on the shaft 22 to be transmitted to the shaft 21, as occurs when an auto moves downhill under compression. The one way brake 34 is important, for example, when the associated vehicle engine starts. The object of the brake 34 is to avoid that the crown plate 18 may rotate in opposite direction of the driven shaft 22 when the vehicle starts.

Subsequently, hydraulic coupling, added to the crown plate 18, will increase the acceleration of the plate 18.

At this point it is noted that the rotation of the driving crown plate 17, moved by the driving shaft 21, may be conditioned, while the other crown plate 18 may be kept immobile. In this case, however, the device will operate not as a continuous change speed gearing but as a reducer of angular velocity between the two shafts. The reduction, by means of this system, will be extremely high.

The conditioning system operates as follows:

The cog wheel 38 is made integrally with the driving shaft 21 and will transmit rotation to the wheel 36. The wheel 36, which forms one piece with the wheel 35, will transmit, in its turn, rotations to the wheel 33 affixed to the driving plate 17, thus conditioning its rotary motion.

Since the speed change gear is completely automatic, as will be shown below, the usual gear shift mechanism (not shown) will be used only for selecting rotary motion, for example, to the wheels of a vehicle, when the vehicle starts. The lever will also be used to shift the engine into neutral, for example, when the vehicle stops. It will also be used with appropriate known forms of gearing (not shown) to reverse the driving directions.

With this change speed system, it is even possible to completely eliminate the usual friction clutch as will be noted below.

The kinematic mechanism, when used as a progressive speed change gear, is based in its rotary motion on the conditioning of the rotary motion between the driving plate 17 as compared with the shaft 21 carrying the driving pinion 19. The remaining driven crown plate 18 functions with the one way clutch mechanism 34. The plates 17 and 18, in this case, turn continuously and are both driving and driven parts, together with the two planetary pinions 19 and 20, without any reduction in motor power.

Gearing may be such that rotation of plate 17 may be lower than the rotation rate of pinion 19. In this case the driving shaft 21 and the driven shaft 22 will rotate in opposite directions. On the contrary, gearing may be such that rotation of plate 17 is higher than the rotation rate of pinion 19. In this case the driving shaft 21 and driven shaft 22 will rotate in the same directions. Of course the rotation of plate 17 is capable of either faster or slower speeds, but is not capable of both without gearing change.

It is opportune at this point to observe that the conditioning system may be studied in connection with the mechanical peculiarities of engines and with the chemical components of fuels used in order to gain maximum efficiency therefrom.

The difference in the number of rotations (maximum and constant traction force, under the same power) may be transmitted from the driving pinion 19 to the driven pinion 20 through the meshing satellite pinions 13.

This arrangement represents the normal first gear speed, but so low that the use of the usual friction clutch system (not shown) is nearly insignificant. This is because the reduction in number of rotations between the driving shaft 21 and the driven shaft 22 is extremely high. This also means that the slipping action of the clutch will be reduced to a minimum. In fact, this feature could allow for complete elimination of the usual friction clutch due to the tremendous reduction in rotations available through the present mechanism. Also it is possible that the conventional clutch may be replaced with a well known form of electric automatic friction appliance. A simple standard device 39, for example, a known form of electric automatic friction appliance as diagrammatically shown in FIG. 7. Such device 39 may also be a standard hydraulic coupling to the plate 18 placed on the side of the driven shaft 22. This coupling is important to increase the acceleration of the plate 18 and, subsequently, the arc elevation of the driven shaft and associated vehicle.

Now it is important to point out that between the driving pinion 19 and the driven pinion 20, i.e. between the motor power and wheel resistance of the associated vehicle, the cruciform reducer will maintain itself in gradual and constant dynamic equilibrium. This means that, with the present invention, during transmission of rotary motion, force-moment and velocity will become directly proportional dimensions.

Thus, as soon as the engine overcomes the resistance of the wheels (load on the driven shaft 22) the velocity of the vehicle will be uniformly accelerated, while the cruciform reducer 10 will assume the right position in its double epicyclic train. In this way the driving and driven pinions 19, 20, with the concentric plates 17 and 18, may perform simultaneously at different acceleration as well as different velocity, as observed above.

So, as the vehicle gathers speed from the power of the engine, the cruciform axles 11 will tend to slow down, while the plates 17 and 18 will turn in opposite directions on the outer satellite pinions 15, progressively assuming the same rate and moreover overtaking each other reciprocally.

It may be noted that if the rotation rate of the driving plate 17 is slightly superior to that of the driving pinion 20, the cruciform axles 11 will tend to speed up. It is advisable during this operation that both plates 17, 18 (which may rotate in opposite directions) be controlled by the conditioning system to rotate in the same direction on satellite pinions 15. The plates 17, 18 thereby form a rotating block. It is advantageous to use the inertia of the rotating mass.

Both driving and driven shafts 21 and 22 may rotate in the same direction also, but the principal of the invention remains completely unchanged.

By means of this invention, every fixed gear ratio between two shafts, existing in the present state of engineering technique, will be eliminated and the velocity, as well as the power of an engine, will be exploited entirely. In this way, the change speed gears on motor vehicles and industrial installations will be substituted.

The importance of the present kinematic mechanism is not only limited to the descriptions enclosed herein. It is extremely versatile and may therefore be applied to a vast extent in the field of mechanics and in industry generally. It may also be used in the field of naval, aeronautic, and in every field of engineering where transmission and reduction of rotary motion are required.

Those who are skilled in the field of transmission and gearing design may readily visualize modifications that may be made without departing from the scope of the present invention as defined in the following claims.

I claim:
1. A kinematic mechanism, comprising:
a housing framework;
two crown plates having central hubs, one plate being a driven crown plate and the other being a driving crown plate;
a driving shaft journalled in the housing for rotation about a central axis, mounting the driving plate for free rotation thereon about said central axis;
a driven shaft journalled in the housing and axially spaced from the driving shaft for coaxial rotation with the driving shaft, mounting the driven plate thereon about said central axis;
a planetary conical pinion affixed to each shaft for rotation therewith;
said planetary conical pinions being mounted concentrically with the crown plates;
means supporting a group of radially extending cruciform axles perpendicular to the central axis and positioned axially between the crown plates and conical planetary pinions;
an outer set of satellite pinions mounted for free rotation on the cruciform axles, with each pinion of the outer set meshing with both crown plates;
an inner set of satellite pinions mounted for free rotation on the cruciform axles and spaced radially inward of the outer set, each pinion of the inner set meshing with both planetary conical pinions;
wherein said cruciform axles and satellite pinions form a cruciform reducer, effecting a double conical epicyclic train that will rotate in a plane perpendicular to the central axis and rotary conditioning means interconnecting the driving shaft and the driving crown plate for rotating the driving shaft and the driving crown plate simultaneously and at different rotational speeds.

2. The mechanism as claimed by claim 1 wherein the rotary conditioning means is comprised of:
   means between the frame and driven crown plate for holding the driven crown plate against rotation about the central axis; and
   brake means on the frame and engageable with the driven crown plate for selectively resisting rotation of the driven crown plate about the central axis.

3. The mechanism as claimed by claim 2 wherein the means between the frame and driven crown plate is comprised of:
   radial pawls fixed to the driven crown plate;
   radial support bars fixed on the frame and extending axially between the pawls, and springs mounted between the pawls and support bars.

4. The mechanism as claimed by claim 1 wherein the rotary conditioning means is comprised of:
   a cog wheel fixed to the driving crown plate;
   a cog wheel fixed to the driving shaft;
   a pair of rigidly connected cog wheels with a small difference in ratio mounted to the frame for free rotation about an axis parallel to the central axis, with one cog wheel of said pair meshing with the crown plate cog wheel and with the other cog wheel of said pair meshing with the cog wheel fixed to the driving shaft.

5. The mechanism as claimed by claim 4 further comprising one way brake means interconnecting the driven crown plate and frame for permitting rotation of the crown plate in one direction only.

6. The mechanism as claimed by claim 1 wherein said means includes a holding ring mounted to radial outward ends of the cruciform axles and surrounding the sets of pinions engaging the crown plates and planetary conical pinions.

7. The mechanism as claimed by claim 1 wherein said means includes a cross brace rigidly supporting the cruciform axles at radial inner ends thereof between the planetary conical pinions.

* * * * *